(No Model.) 4 Sheets—Sheet 1.

C. P. HIGGINS.
END PLACING MACHINE FOR HEADERS OR OTHER TUBES.

No. 503,964. Patented Aug. 29, 1893.

Witnesses
Chas. Hanimann
N. Marler

Inventor
Campbell P. Higgins
By his Attorney
Chas. W. Forbes (No Model.)  4 Sheets—Sheet 3.

C. P. HIGGINS.
END PLACING MACHINE FOR HEADERS OR OTHER TUBES.

No. 503,964.  Patented Aug. 29, 1893.

Witnesses
Chas. Hanimann
N. Marler

Inventor
C. P. Higgins
By his Attorney
Chas. W. Fowler (No Model.)  4 Sheets—Sheet 4.

C. P. HIGGINS.
END PLACING MACHINE FOR HEADERS OR OTHER TUBES.

No. 503,964. Patented Aug. 29, 1893.

UNITED STATES PATENT OFFICE.

CAMPBELL P. HIGGINS, OF NEW YORK, N. Y.

END-PLACING MACHINE FOR HEADERS OR OTHER TUBES.

SPECIFICATION forming part of Letters Patent No. 503,964, dated August 29, 1893.

Application filed July 5, 1892. Serial No. 439,063. (No model.)

*To all whom it may concern:*

Be it known that I, CAMPBELL P. HIGGINS, of the city, county, and State of New York, have invented certain new and useful Improvements in End-Placing Machines for Headers or other Tubes, of which the following is a specification.

My invention relates to the manufacture of headers for sectional water tube steam boilers, or other metallic boxes which are made from a tube of rectangular or other polygonal cross-sectional form.

The object of my invention is to provide an apparatus adapted to automatically insert the end pieces of the tube and clinch the same in position preparatory for welding in a separate machine.

My invention is especially adapted for conjunctive use in a header plant wherein the heating and welding fires and the end placing and end welding and other machines are located in proximity, and the work suspended from a common crane during the successive operations.

In order that others may understand and use the invention I will first proceed to describe an apparatus embodying the same and subsequently will point out in the claims its novel features.

Figure 1:
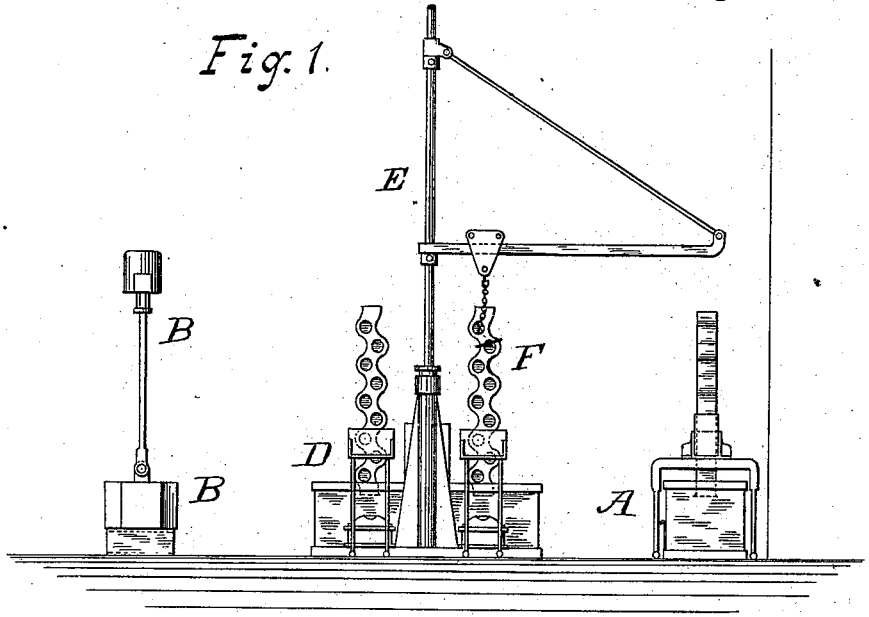
Figure 2:
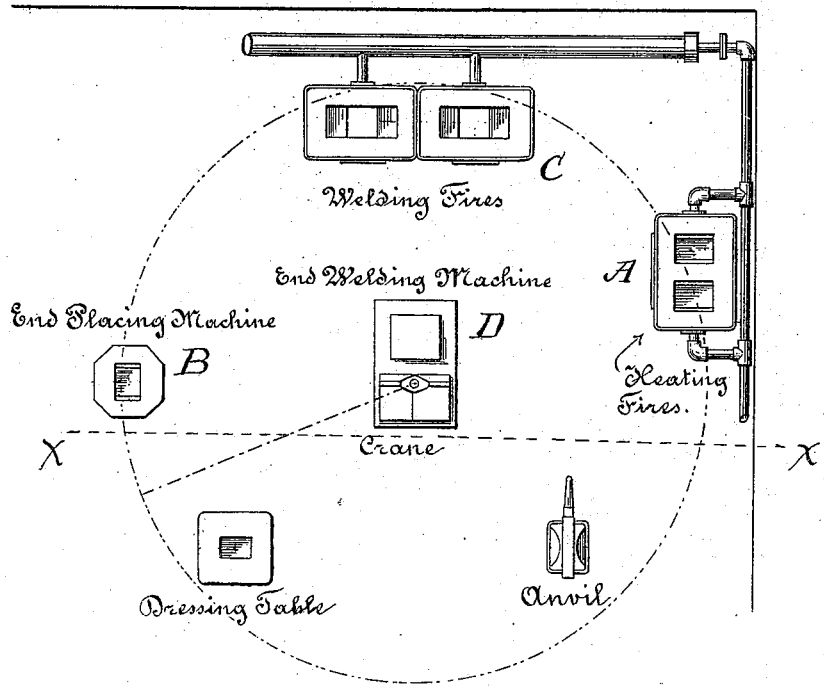
Figure 3:
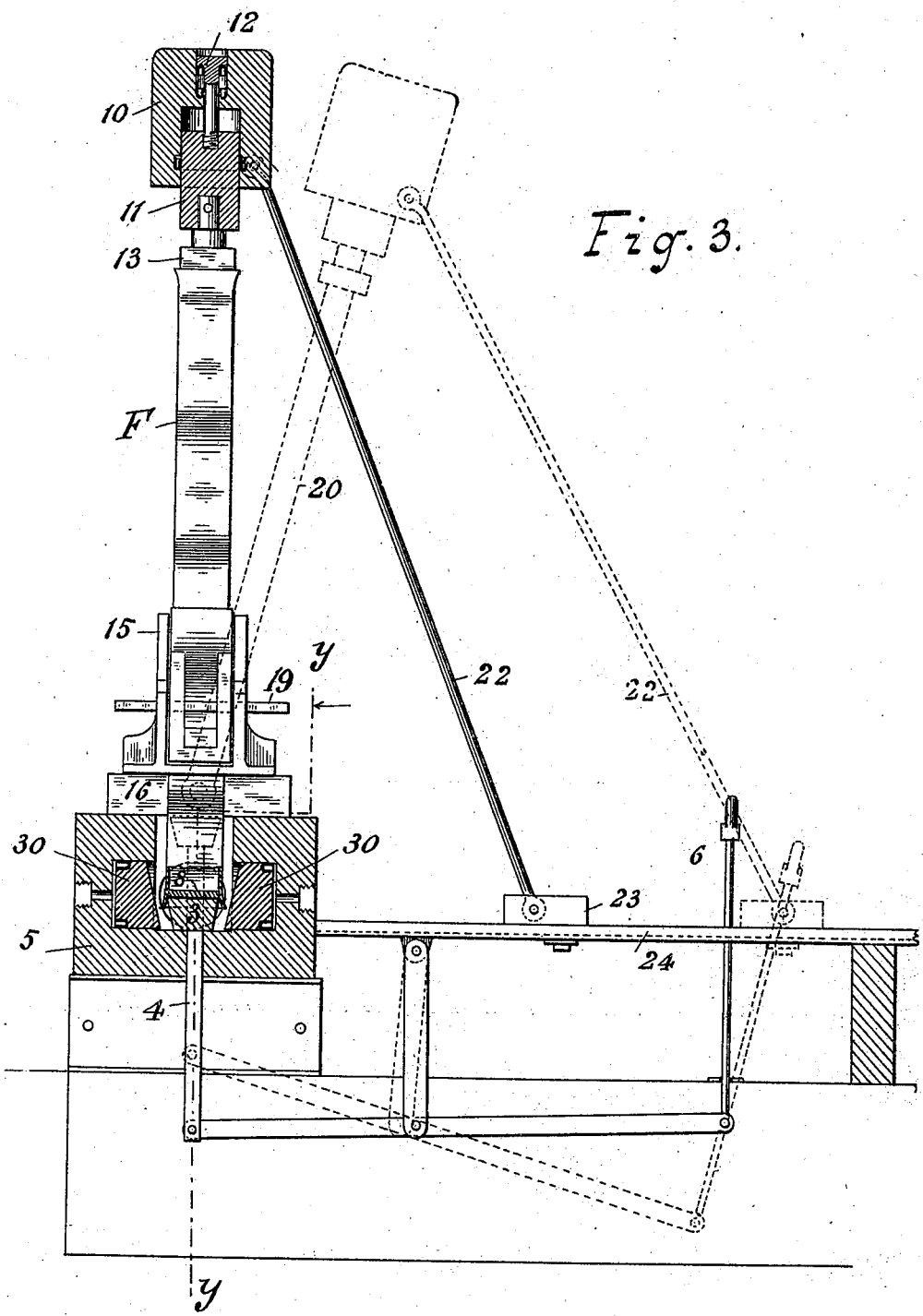
Figure 4:
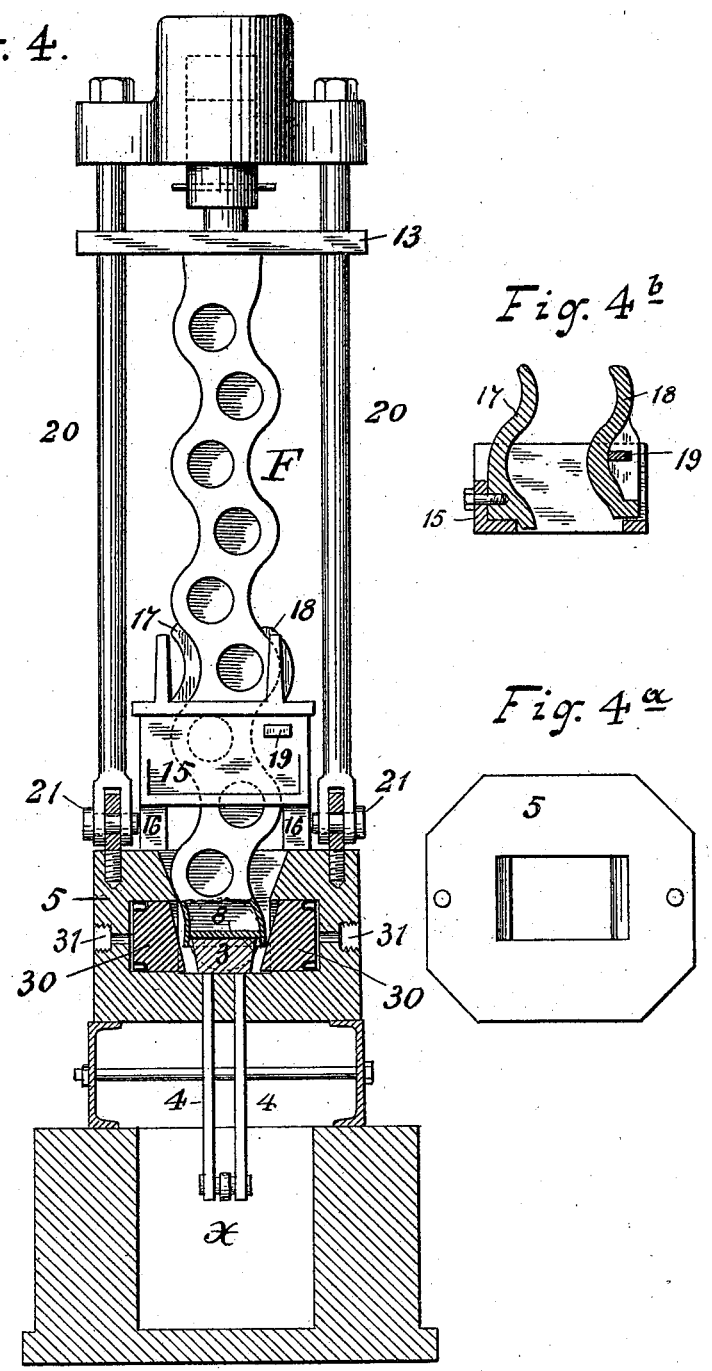
Figure 5:
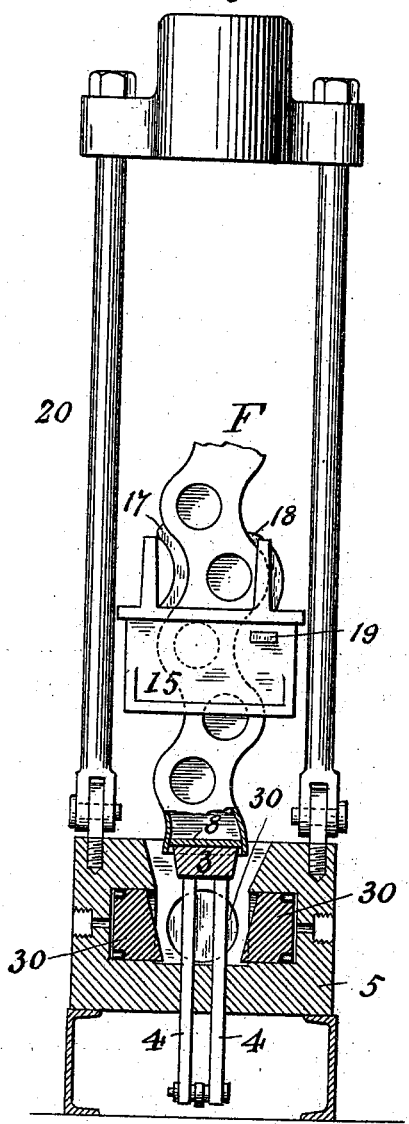
Figure 6:
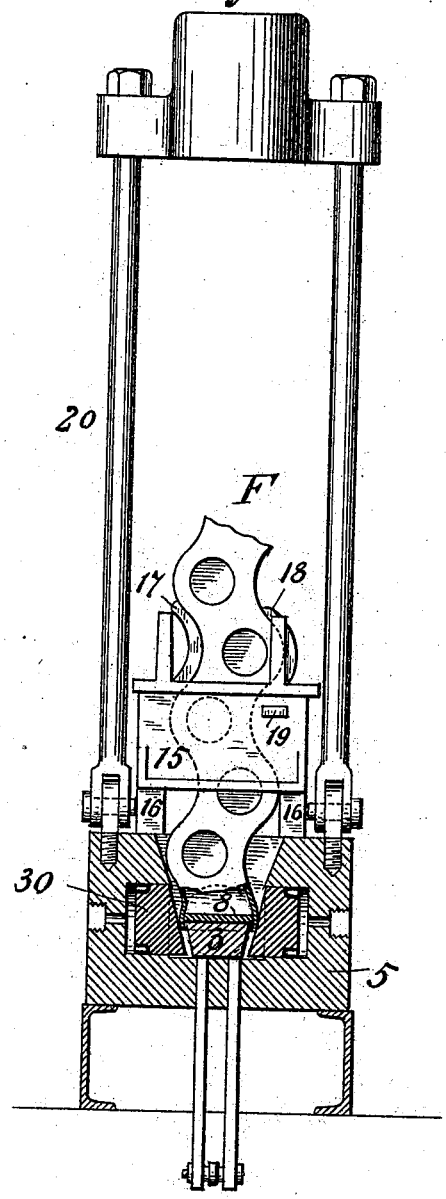

Referring to the accompanying drawings, in which similar characters of reference indicate corresponding parts throughout the several views: Figure 1, is an elevation of the part of the header plant relating hereto, taken on the line x—x, Fig. 2; Fig. 2, a plan view of the same; Fig. 3, a sectional side elevation of the end placing machine; Fig. 4, a front elevation of the machine taken partly in section on the line y—y, Fig. 3; Fig. 4ª, a plan view of the multiple compressing cylinder; Fig. 4ᵇ, a detail view showing the draw-box in section. Fig. 5 is a sectional elevation of the machine taken on the line y—y, Fig. 3, showing a preparatory position; and Fig. 6, a similar sectional elevation showing the final position of compression.

In Figs. 1 and 2, A represents the heating furnace; B, the end placing machine; C, the welding fire; and D, the end welding machine; the header being passed from one to another of said appliances in the order named.

The parts designated by the terms "dressing-table" and "anvil" in Fig. 2, represent suitable supports upon which the work is placed for operating upon it by hand or otherwise in order to perfect the same.

E, represents a suitable crane by which the header F, is suspended endwise and elevated or lowered and transferred about during the several operations.

The end welding machine herein referred to is fully described and claimed in my separate patent application filed simultaneously herewith, Serial No. 439,060.

3, Figs. 3 to 6, inclusive, represents the end placing block supported on the bed 5, and operated on vertically movable rods 4, extending through the bottom of the bed. The block 3, may be raised when free from pressure, to the position shown in Fig. 5, for introducing the end piece in position by depression of the handle 6, connected by a lever as indicated.

8, represents the end piece which is placed by means of the machine in the end of the corrugated header F.

10, (Fig. 3) is a hydraulic cylinder provided with an inserting ram, 11, and a retracting plunger 12, and head 13, adapted for forcing the header down over the block 3.

15, represents a stop collar which is functionally a stop to limit the downward stroke given to the header F, thereby determining the distance of insertion of the end piece 8. The draw-box 15, rests at the termination of its stroke on the bearing blocks 16.

The stop collar 15, as shown in Fig. 4ᵇ, is composed of the stationary piece 17, and movable block 18, keyed into the flanks of the piece 17, by means of the key 19, and the binding faces of the parts 17, and 18, correspond to the serpentine contour of the header F, and are thus adapted for secure attachment. The frame 20, supporting the cylinder 10, is swiveled at 21, so that it may be thrown out of vertical alignment with the header F, after the hydraulic head 13, has been retracted, and the angular motion of the frame 20, which is indicated by dotted lines in Fig. 3, is regulated by the rod 22, and block 23, adapted to be moved or secured in the ways 24, at different positions.

30, represents four hydraulic rams in the multiple cylinder in the bed 5, which are adapted to advance upon the four respective sides of the rectangular tube F; suitable water connections being provided. The faces of the rams 30, are inclined so that when compressed they partially upset the flanges of the header or box inward and clinch the end piece after it has been inserted.

The operation of my invention is as follows: The header F, suspended on the crane E, with its stop collar 15, attached, is brought from the heating fires A, to the end placing machine B, and the frame 20, being retired to its angular position shown at Fig. 3, the header with its end heated is dropped over the end piece 8, which has been placed upon the block 3, as in Fig. 5. The whole is then lowered into the machine until the block 3, rests upon the base 5, as indicated in Figs. 3 and 4; and the cylinder 10 then brought into vertical alignment and pressure applied to the plunger 11, forcing the header hard down on to the bearing blocks 16, as shown at Figs. 3 and 4. While in this position, the hydraulic pressure is applied to the four radially moving rams 30, as shown at 6, and the inclined faces of these rams force the four sides of the header hard on to the end piece 8, which has been pushed into the same, thus clinching it in position. The top of the cylinder 10, is then swung back as shown by dotted lines in Fig. 3, and the header withdrawn with its end piece fixed in position. It is next taken and dropped into the welding fire C, with its drawbox 15, attached, and heated to a welding heat for subsequent operation in a welding machine described in my said separate application.

Having thus fully described my invention, what I claim, and desire to secure by Letters Patent, is—

1. In an end placing machine for headers or other tubes, a vertically movable inserting block for supporting the end piece, means for forcing the header down over the inserting block, and lateral to the inserting block a series of movably supported rams provided with means for moving them radially inward adapted to advance upon the sides of the header after the end piece is inserted, and clinch the same substantially as described.

2. In an end placing machine for headers or other tubes, an inserting block, a limiting stop constructed to be attached to the header, an abutment for limiting the descent of the same, and a hydraulic ram for advancing the header against the said block.

3. In an end placing machine for headers or other tubes, an inserting block for the end piece, a stop forming a rest constructed to be attached to the header and support the same vertically upon the machine, and above the header a hydraulic cylinder for advancing the same and a suitable swiveling frame for throwing the cylinder into or out of alignment with the header when active or inactive respectively for the purpose described.

4. In an end placing machine for headers or other tubes a series of movably supported rams provided with means for moving them radially inward and compressing the sides of the header, a vertically movable inserting block for the end piece, a rod extending through and movable within the frame work of the machine for moving the said block and means for forcing the header over the block opposite the rams, substantially as and for the purpose described.

CAMPBELL P. HIGGINS.

Witnesses:
NAT. M. PRATT,
FRANCIS L. WARD.